United States Patent
Biere et al.

(10) Patent No.: US 7,653,418 B1
(45) Date of Patent: Jan. 26, 2010

(54) AUTOMATIC ROTATION THROUGH PLAY OUT OF AUDIO-CLIPS IN RESPONSE TO DETECTED ALERT EVENTS

(75) Inventors: Devon L. Biere, Olathe, KS (US); Michael A. Gailloux, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 858 days.

(21) Appl. No.: 11/237,058

(22) Filed: Sep. 28, 2005

(51) Int. Cl.
*H04B 1/38* (2006.01)
*H04M 1/00* (2006.01)

(52) U.S. Cl. .............. 455/567; 455/3.03; 455/3.06; 455/412.2; 455/414.1; 340/384.1; 340/692; 340/328; 386/52

(58) Field of Classification Search .......... 455/567, 455/3.03, 3.06, 414.1, 412.2; 340/384.1, 340/692; 386/52, 96
See application file for complete search history.

(56) References Cited

U.S. PATENT DOCUMENTS

| | | | |
|---|---|---|---|
| 5,870,683 A | 2/1999 | Wells et al. | |
| 6,414,725 B1 * | 7/2002 | Clarin et al. | 348/714 |
| 6,473,099 B1 | 10/2002 | Goldman et al. | |
| 6,714,826 B1 * | 3/2004 | Curley et al. | 700/94 |
| 6,943,681 B2 * | 9/2005 | Rezvani et al. | 340/506 |
| 6,993,349 B2 | 1/2006 | Martinez et al. | |
| 7,031,437 B1 | 4/2006 | Parsons et al. | |
| 7,142,645 B2 | 11/2006 | Lowe | |
| 7,162,220 B2 | 1/2007 | Hanson | |
| 7,221,855 B2 * | 5/2007 | Kim et al. | 386/96 |
| 7,391,300 B2 * | 6/2008 | Inkinen | 340/384.1 |
| 7,409,569 B2 * | 8/2008 | Illowsky et al. | 713/323 |
| 2003/0109251 A1 | 6/2003 | Fujito et al. | |
| 2004/0032946 A1 | 2/2004 | Koser et al. | |
| 2005/0136988 A1 | 6/2005 | Vilamil et al. | |
| 2005/0170865 A1 | 8/2005 | Harvej et al. | |
| 2005/0185918 A1 | 8/2005 | Lowe | 386/46 |
| 2005/0227674 A1 | 10/2005 | Kopra et al. | |
| 2005/0286497 A1 | 12/2005 | Zutaut et al. | |
| 2006/0015649 A1 | 1/2006 | Zutaut et al. | |
| 2006/0028951 A1 | 2/2006 | Tozun et al. | |
| 2006/0060069 A1 | 3/2006 | Sinisalo | |

(Continued)

FOREIGN PATENT DOCUMENTS

WO   WO 2006/002645   1/2006

OTHER PUBLICATIONS

LightWav 5 for Treo600/650 5.72, http://www.palmgear.com/index.cfm?fuseaction=software.showsoftware&PartnerREF=&siteid=1&prodid=92488&siteid=1, printed from the World Wide Web on Sep. 27, 2005.

(Continued)

*Primary Examiner*—Marceau Milord

(57) ABSTRACT

A method and device for detecting alert events and responsively playing out audio-clips. The audio-clips may comprise data representing a sound recording. Playing out the audio-clips occurs in an order defined by a sequence. The audio-clips and the sequence are maintained in data storage. A processor executes program logic to detect a first alert event and responsively play out at least a first audio-clip of the sequence, and to detect a next alert event and responsively play out at least a next alert event of the sequence. After playing out all audio-clips in the sequence, play out of the audio-clips may then continue with the first audio-clip of the sequence.

27 Claims, 4 Drawing Sheets

U.S. PATENT DOCUMENTS

| | | |
|---|---|---|
| 2006/0077055 A1 | 4/2006 | Basir |
| 2006/0095472 A1 | 5/2006 | Krikorian et al. |
| 2006/0117040 A1* | 6/2006 | Begeja et al. ............ 707/100 |
| 2006/0259434 A1 | 11/2006 | Vilcauskas, Jr. et al. |
| 2007/0226432 A1 | 9/2007 | Rix |

OTHER PUBLICATIONS

LightWav 5.7.2, http://mytreo.net/downloads/details-108.html? LightWav, printed from the World Wide Web on Sep. 27, 2005.

Verizon Wireless, VZW Tones, Feb. 22, 2005.

Caller Ringtones, http://crt.maxis.com.my/prbt/user_console/RbtAdmin/english/BrowsingPage.jsp, printed from the World Wide Web on Sep. 27, 2005.

U.S. Appl. No. 11/217,654, filed Sep. 1, 2005, entitled Automatic Delivery of Custom Ringtones Including Static and Dynamic Portions.

"Theme Master—A Pocket PC Utility Used to Switch Your Today Screen Theme," Theme Master, http://www.theraggios.com/rpa/ThemeMaster.htm, printed from the World Wide Web on Dec. 7, 2005.

"Cell Phone Wallpaper," Free Cell Phone Wallpaper, http://www.flash-screen.com/free-wallpaper/cell-phone-wallpaper.html, printed from the World Wide Web on Dec. 6, 2005.

H. Schulzrinne et al., RTP: A transport for Real-Time Applications, Network Working Group—Request for Comments: 3550, Jul. 2003.

U.S. Appl. No. 11/561,429, entitled "Method and Apparatus for Establishing a Media Clip," filed Nov. 20, 2006.

Jason Fields, MP3 Speaking Ringtones for 802se, Mar. 8, 2005, downloaded from the world wide web at http://www.air-port.com/blog2/03/08/2005/mp3-speaking-ringtones-for-802se/.

Hayden Porter, Phone it in!, Feb. 1, 2004, downloaded from the world wide web at http://emusician.com/mag/desktop/emusic_phone/.

Pictones, downloaded from the world wide web on Sep. 1, 2005 at http://musiwave.net/pictones-multimedia-ringtones.html.

Musitones, downloaded from the world wide web on Sep. 1, 2005 at http://www.musiwave.net/musitones-real-music-ringtones.html.

Logo & Images, downloaded from the world wide web on Sep. 1, 2005 at http://www.musiwave.net/mobile-phone-services-provider.html.

* cited by examiner

AUTOMATIC ROTATION THROUGH PLAY OUT OF AUDIO-CLIPS IN RESPONSE TO DETECTED ALERT EVENTS

FIELD OF INVENTION

The present invention relates to devices that detect alert events, and more particularly to devices that play out audible alerts in response to detecting alert events.

DESCRIPTION OF RELATED ART

An alert event is an event that warrants playing out an alert so as to provide notice that the event has occurred, is occurring, or is about to occur. Examples of alert events include: (i) closure of a door-bell switch or another type of switch, (ii) a telephone receiving a signal that indicates a phone call is available for connection to the telephone, (iii) a personal computer receiving a signal that indicates an Instant Message (IM) or another type of message has been received at the personal computer, and (iv) a programmable logic controller (PLC) detecting a fluid level of a fluid-holding reservoir has met or surpassed a particular fluid level threshold. Other examples of alert events are also possible.

An alert is a means to provide notice that an alert event has occurred, is occurring, or is about to occur. An alert may be played out for a single person or a group of people. An alert may be played out by a device that detects the alert event. A common type of alert is an audible alert. An audible alert may consist of a single sound (e.g., a 1 kHz tone) or a combination of sounds (e.g. a musical passage).

One method used by devices to play out an audible alert consists of playing out an audio-clip. An audio-clip consists of data (e.g., digital data) that represent an audible passage. An audible passage may include any sound or combination of sounds that can be detected and encoded as data. Preferably, an audible passage will include a sound or combination of sounds within the frequency range of sounds perceptible to a human being (approximately 20-20,000 Hz). Examples of an audible passage include a spoken passage and a musical passage. Other examples of an audible passage are also possible.

To play out an audio-clip, a device will typically convert the digital data of the audio-clip into an analog signal and then provide the analog signal to a loud speaker. The loud speaker will then convert the analog signal to an acoustic signal for a user to hear.

Some devices play out the same audio-clip for every alert event they detect. For example, the earliest-made cell phones typically play out the same audio-clip for each and every type of alert event detected by the cell phone. In particular, some of the earliest-made cell phones play a particular audible clip (e.g., a particular ringtone) each time the cell phone detects that a call is available for connection to the cell phone, regardless of who places the phone call.

Other devices may have multiple audio-clips and may be set to select a particular audio-clip to play out depending on the type of alert event. For example, more recently-made cell phones may play one audio-clip each time the cell phone detects that a phone call from a designated caller is available for connection to the cell phone, and may play another, different, audio-clip each time the cell phone detects that a phone call from another designated caller is available for connection to the cell phone.

SUMMARY

The present invention advances over the existing art by providing an improved apparatus and method for playing out a plurality of audio-clips in response to detecting alert events.

In one respect, an exemplary embodiment of the present invention may take the form of a method that includes: (i) maintaining in data storage a set of audio-clip data that defines a plurality of distinct audio-clips and a particular sequence in which the audio-clips should be played out, (ii) detecting a first alert event and responsively playing out at least a first audio-clip of the sequence, and (iii) detecting a next alert event and responsively playing out at least a next audio-clip of the sequence.

In another respect, an exemplary embodiment of the present invention may take the form of a device that comprises data storage, a processor, and a communication interface. The data storage contains a set of audio-clip data and program logic. The set of audio-clip data defines a plurality of distinct audio-clips and a particular sequence in which the audio-clips should be played out. The processor executes the program logic to detect a first alert event and responsively play out at least a first audio-clip of the sequence and to detect a next alert event and responsively play out at least a next audio-clip of the sequence.

In yet another respect, an exemplary embodiment of the present invention may similarly take the form of a device that comprises data storage, a processor, and a communication interface. The data storage contains a first set of audio-clip data, a second set of audio-clip data, and program logic. The first set of audio-clip data defines a first set of audio-clips of a plurality of distinct audio-clips and a first sequence in which the audio-clips of the first set should be played out. The second set of audio-clip data defines a second set of audio-clips of the plurality of distinct audio-clips and a second sequence in which the audio-clips of the second set should be played out. The processor executes the program logic to detect a first alert event of a first type and responsively play out at least a first audio-clip of the first sequence, and to detect a second alert event of the first type and responsively play out at least a next audio-clip of the first sequence. Moreover, the processor executes the program logic to detect a first alert event of a second type and responsively play out at least a first audio-clip of the second sequence, and to detect a second alert event of the second type and responsively play out at least a next audio-clip of the second sequence.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

BRIEF DESCRIPTION OF THE DRAWINGS

Exemplary embodiments of the invention are described herein with reference to the drawings, in which.

DETAILED DESCRIPTION

1. Exemplary Architecture

The present invention provides means for playing out a plurality of audio-clips in response to detecting alert events. For each alert event detected, at least one audio-clip is played out. Play out of the audio-clips occurs according to a pre-defined sequence.

Figure 1:
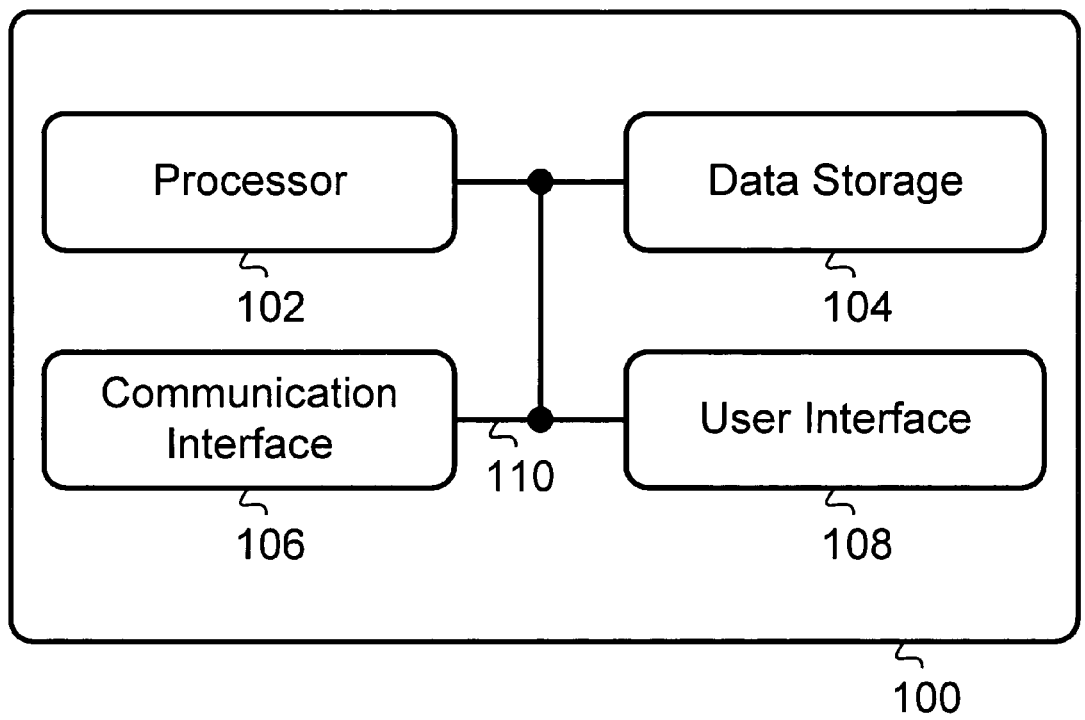
FIG. 1 is a block diagram of a device in which an exemplary embodiment can be carried out.

An exemplary embodiment of the present invention may take the form of a device 100 as shown in FIG. 1. As illustrated, the device 100 includes a processor 102, data storage 104, a communication interface 106, and a user interface 108, all linked together via a system bus, network, or other connection mechanism 110.

It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

The device 100 may take the form of any of a variety of devices for carrying out the present invention. For example, the device 100 may take the form of a wireless communication device such as a cell phone, a personal digital assistant (PDA), a pager, and/or a notebook computer having a wireless network interface. As another example, the device 100 may take the form of a device having a wireline network interface. A device having a wireline network interface may take the form of a telephone (e.g., a Session Initiation Protocol (SIP) telephone) or a programmable logic controller (PLC). Other examples of the device 100 are also possible.

The processor 102 may comprise one or more processors (e.g., a general purpose processor and/or a digital signal processor). The processor 102 provides means for executing program logic that enables the processor 102 to work in cooperation with the data storage 104, the communication interface 106, the user interface 108, and the connection mechanism 110 to carry out functions according to the present invention.

The data storage 104 comprises a computer-readable medium readable by the processor 102. The computer-readable medium may comprise volatile and/or non-volatile storage components, such as optical, magnetic, organic or other memory or disc storage, which can be integrated in whole or in part with the processor 102. Alternatively, the entire computer-readable medium may be remote from the processor 102. A remote computer-readable medium may communicate with the processor 102 via the connection mechanism 110.

The data storage 104 may store various types of data. For example, the data storage 104 may store program logic executable by the processor 102. In particular, and by way of example, the program logic may comprise program instructions executable by the processor 102 to (i) detect a first alert event and responsively play out at least a first audio-clip of a sequence of audio-clips, (ii) detect a next alert event and responsively play out at least a next audio-clip of the sequence of audio-clips, and (iii) detect subsequent alert events and responsively play out at least one additional audio-clip of the sequence of audio-clips for each of the subsequently detected alert events. Other examples of program logic executable by the processor 102 are also possible, some of which are described below.

Figure 2:
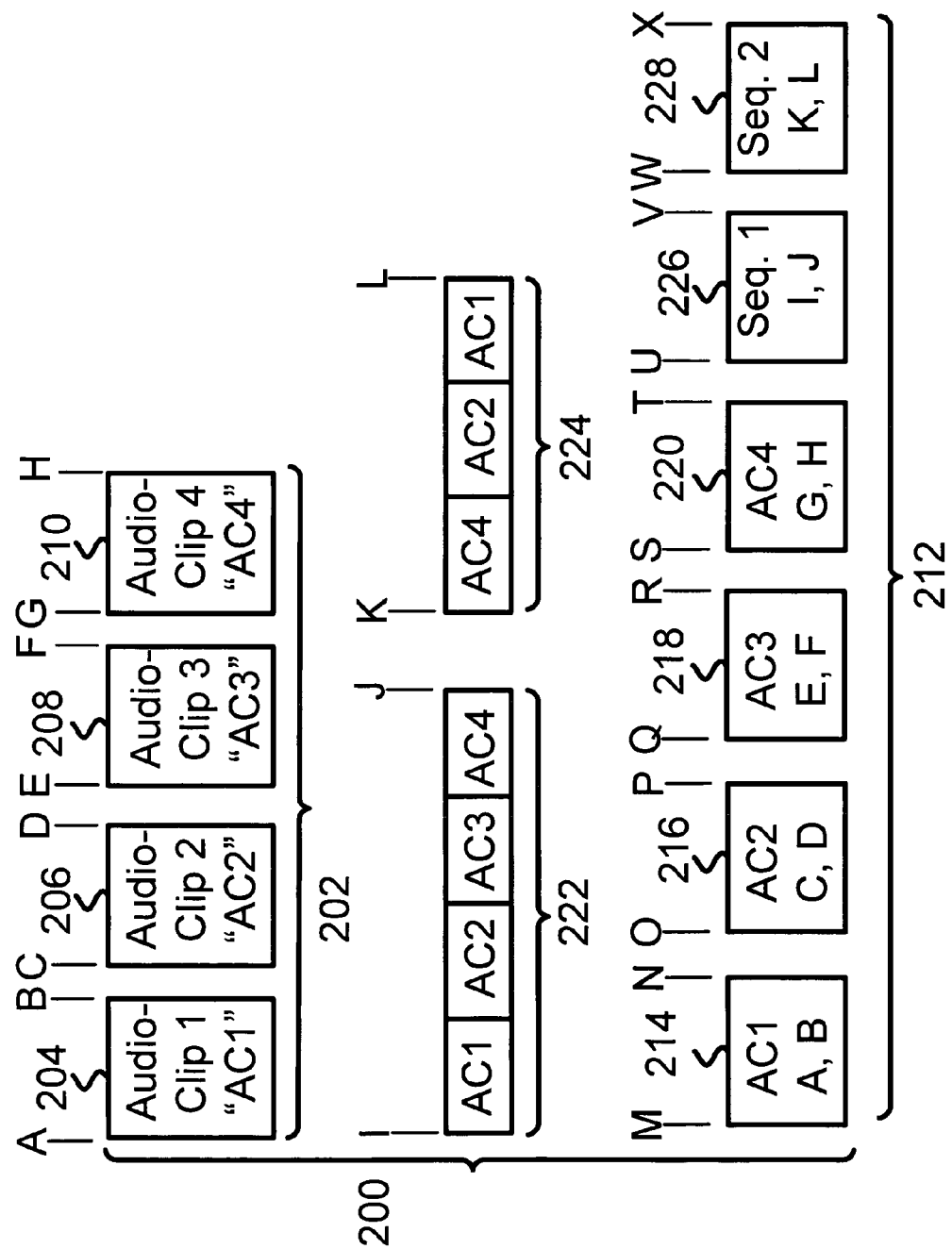
FIG. 2 is a diagram depicting examples of data storable in data storage in accordance with an exemplary embodiment.

As another example, the data storage 104 may store audio-clip data. One or more sets of audio-clip data may be stored in the data storage 104. Each set of audio-clip data may include a variety of data. FIG. 2 depicts a set of audio-clip data 200 that includes data defining a set of audio-clips 202. The set of audio-clips 202 comprises data defining a first audio-clip ("AC1") 204, a second audio-clip ("AC2") 206, a third audio-clip ("AC3") 208, and a fourth audio-clip ("AC4") 210. Alternatively, the set of audio-clips 202 could include data that defines a number of audio-clips that is greater than four audio-clips or data that defines two or three audio-clips.

FIG. 2 depicts a plurality of pointers. The pointers are labeled as A-X for simplicity, but in actual practice, the pointers may be represented by data that facilitates locating data within the data storage 104. For example, the pointers may be numerical addresses of the data storage 104. In particular, for example, pointer A may be represented by a decimal address of 100,000 and pointer B may be represented by a decimal address of 199,999. Alternatively, each of the pointers may be represented by a hexadecimal number or by another type of number.

In accordance with the example above, the first audio-clip 204 comprises 100,000 bytes of data (i.e., data bytes 100,000 through 199,999). Alternatively, the first audio-clip 204, as well as each of the other audio-clips of the set of audio-clips 202, may comprise a number of data bytes that is greater than or less than 100,000 data bytes.

Some of the pointers A-X may indicate a starting-point and/or a starting-time for a particular portion of audio-clip data. For example, pointers A, C, E, and G may identify a starting-time for each audio-clip of the set of audio-clips 202, respectively. For instance, pointer A may identify a starting-time of 0 seconds, pointer C may identify a starting-time of 5 seconds, pointer E may identify a starting-time of 10 seconds, and pointer G may identify a starting-time of 15 seconds. Other examples of some of the pointers A-X indicating a starting-point and/or a starting-time for a particular portion of audio-clip data are also possible.

Alternatively, some of the pointers A-X may indicate an ending-point and/or an ending-time for a particular portion of audio-clip data. For example, pointers B, D, F, and H may identify an ending-time for each audio-clip of the set of audio-clips 202, respectively. For instance, pointer B may identify an ending-time of 5 seconds, pointer D may identify an ending-time of 10 seconds, pointer F may identify an ending-time of 15 seconds, and pointer H may identify and ending-time of 20 seconds. Other examples of some of the pointers A-X indicating an ending-point and/or an ending-time for a particular portion of audio-clip data are also possible.

The audio-clip data 200 may include meta data 212. The meta data 212 comprises data about data. As an example, the meta data 212 may include data defining the boundaries of each audio-clip of the set of audio-clips 202. For example, a first block of meta data 214 defines boundaries of the first audio-clip 204 (i.e., AC1) as pointer A and pointer B. A second block of meta data 216 defines boundaries of the second audio-clip 206 as pointer C and pointer D. A third block of meta data 218 defines boundaries of the third audio-clip 208 as pointer E and pointer F. A fourth block of meta data 220 defines boundaries of the fourth audio-clip 210 as pointer G and pointer H.

The data defining the audio-clips of the set of audio-clips 202 can define a variety of audio-clips. For example, the first audio-clip 204 may comprise data for playing out a first segment of a first sound recording (e.g., seconds 0-5 of "Hey Jude" by the Beatles), the second audio-clip 206 may comprise data for playing out a second segment of the first sound recording (e.g., seconds 5-10 of "Hey Jude" by the Beatles), the third audio-clip 208 may comprise data for playing out a third segment of the first sound recording (e.g., seconds 10-15 of "Hey Jude" by the Beatles), and the fourth audio-clip 210 may comprise data for playing out a fourth five-second segment of the first sound recording (e.g., seconds 15-20 of "Hey Jude" by the Beatles). Alternatively, one or more of the audio-clips of the set of audio-clips 202 may include a segment of the first sound recording that is greater than or less than five seconds.

In another example, one or more audio-clips of the set of audio-clips 202 may comprise data for playing out a segment of a different sound recording (i.e., other than the first sound recording). In yet another example, one or more audio-clips of the set of audio-clips 202 may comprise data for playing out an entire sound recording (e.g., an entire song or an entire spoken quotation). Other examples of the sound recordings represented by the audio-clips of the set of audio-clips 202 are also possible.

The set of audio-clip data 200 may also include data defining one or more sequences for playing out audio-clips of a plurality of audio-clips. As shown in FIG. 2, the set of audio-clip data 200 includes a first sequence 222 and a second sequence 224. Alternatively, the set of audio-clip data 200 may include a number of sequences greater than or less than two. The audio-clips of a sequence are played out sequentially in response to detected alert events. However, each audio-clip of the sequence is not necessarily played out each time an alert event is detected.

The first sequence 222 defines a first order for playing out a plurality of audio-clips of the set of audio-clips 202. Playing out audio-clips according to the first sequence 222 includes playing out the first audio-clip 204, then the second audio-clip 206, then the third audio-clip 208, and then the fourth audio-clip 210. After completing playout of all audio-clips of the first sequence 222, if another audio-clip of the first sequence is to be played out, playout may continue at the beginning of the first sequence 222 (i.e., the first audio-clip 204).

The second sequence 224 defines a second order for playing out a plurality of audio-clips of the set of audio-clips 202. Playing out audio-clips according to the second sequence 224 includes playing out the fourth audio-clip 210, then the second audio-clip 206, then the first audio-clip 202. After completing playout of all audio-clips of the second sequence 224, if another audio-clip of the second sequence is to be played out, playout may continue at the beginning of the second sequence 224 (i.e., the fourth audio-clip 210).

The second sequence 224 illustrates that a sequence may include a number of audio-clips less than the number of audio-clips defined by a set of audio-clip data. In another example, the first sequence 222 and/or the second sequence 224 may comprise one or more audio-clips of the set of audio-clips 202 more than one time.

The meta data 212 may also include data that defines boundaries of a sequence. As an example, the meta data 212 includes (i) a fifth block of meta data 226 defining boundaries of the first sequence 222 as pointer I and pointer J, and (ii) a sixth block of meta data 228 defining the boundaries of the second sequence 224 as pointer K and pointer L.

Data that defines boundaries of a sequence may be used in various ways. For example, data defining boundaries of a sequence may be used by program logic to locate a starting-point of a sequence and to determine when the end of a sequence has been reached. Other examples of using data defining boundaries of a sequence are also possible. Moreover, other examples of data that may be stored in the data storage 104 are also possible.

The communication interface 106 provides an interface to one or more communication networks. The interface to one or more communication networks provides means for receiving data communications from the one or more communication networks and/or for sending data communications to the one or more communication networks.

The communication interface 106 also provides an interface to the connection mechanism 110. The interface to the connection mechanism 110 provides means for transmitting data communications received at the communication interface 106 to the processor 102, the data storage 104, and/or the user interface 108. The interface to the connection mechanism 110 also provides means for receiving data communications from the processor 102, the data storage 104, and/or the user interface 108.

The communication interface 106 may include a chipset and antenna for performing wireless communication over a wireless network air interface. An exemplary chipset that facilitates communication according to the Code Division Multiple Access (CDMA) air interface protocol is the MSM6000™ chipset manufactured by Qualcomm Incorporated of San Diego, Calif. An exemplary chipset that facilitates communication according to the Bluetooth air interface protocol is the BCM2004 chipset manufactured by the Broadcom Corporation of Irvine, Calif. Other examples of a chipset for performing wireless communication over a wireless network air interface and other examples of air interface protocols are also possible.

Alternatively, or in combination, the communication interface 106 may include a chipset for performing wireline communications. Performing wireline communications may include transmitting data using a fixed, physical connection, such as metal wire or fiber optic cable. The chipset for performing wireline communications may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The communication interface 106 may receive various types of data. For example, the communication interface 106 may receive audio-clip data sent from a network server. The network server may be operated by an audio-clip service provider. The audio-clip service provider may provide means for a user of the device 100 to select one or more audio-clips and other audio-clip data to be transmitted to the communication interface 106.

Alternatively, or in combination, the audio-clip service provider may periodically transmit one or more audio-clips and other audio-clip data to the communication interface 106. In this regard, the audio-clip service provider may send audio-clips of the most popular sound recordings (e.g., based on sales of the sound recordings) once a week to the communication interface 106. Other examples of the audio-clip service provider periodically sending audio-clip data to the communication interface 106 are also possible.

The communication interface 106 may also receive data communications that warrant playing out an audio-clip to alert a user of the device 100 that the data communication has been received. As an example, the communication interface 106 may receive a data communication that indicates a phone call is available for connection to the device 100. In this regard, for example, the data communication may include a paging message sent over a wireless air interface or a SIP NOTIFY message sent over a wireline network.

As another example, the communication interface 106 may receive a message-alert that indicates a message is available for a user of the device 100. In this regard, for example, the message available for a user may comprise a voice-mail message, an e-mail message, or another type of message.

As yet another example, the communication interface 106 may receive a data communication that comprises a message. For example, the data communication could comprise a Short Message Service (SMS) message, an Instant Message (IM), a voice-mail message, an e-mail, or another type of message. Other examples of a data communication receivable at the communication interface 106 are also possible.

The user interface 108 includes means for presenting information to a user. As an example, the user interface 108 may present information to the user audibly. In this regard, the user interface 108 may include one or more audio output interfaces. Each of the one or more audio output interfaces may include a loud-speaker for converting an analog voltage signal to sound waves that are audible to the user. The analog voltage signal may be an output of a digital-to-analog converter. For instance, the digital-to-analog converter may receive an audio-clip in digital form as an input, convert the audio-clip to an analog voltage signal, and then output the analog voltage signal. Each of the one or more audio output interfaces may further include electronic circuitry, such as circuitry that amplifies the analog voltage signal prior to providing the analog voltage signal to the loud-speaker.

As another example, the user interface 108 may present information to a user visually. In this regard, the user interface 108 may include one or more displays for presenting information. The one or more displays may include any of a variety of displays. For instance, the one or more displays could include a Liquid Crystal Display LCD, a Cathode Ray Tube (CRT), and/or an Organic Light Emitting Diode (OLED) display. Other examples of the one or more displays are also possible.

The user interface 108 may present a variety of information to a user visually. For example, the one or more displays of the user interface 108 may display a song title and/or lyrics associated with a particular audio-clip. In this regard, the user interface 108 may display the song title and/or lyrics while the particular audio-clip is playing through the one or more audio output interfaces.

As another example, the one or more displays of the user interface 108 may display a user prompt for prompting the user to enter an input to indicate whether the user approves of the device 100 carrying out various functions. Examples of functions that may require user approval include (i) receiving a new set of audio-clip data, (ii) storing the new set of audio-clip data in the data storage 104, and/or (iii) storing the new set of audio-clip data in the data storage 104 at a location in data storage 104 that comprises a previously-stored set of audio-clip data. Other examples of functions that may require user approval are also possible.

The user interface 108 also includes means for receiving information from a user. A variety of information may be received from a user. For example, the user interface 108 may receive information that indicates whether the user approves of the device 100 receiving a new set of audio-clip data. As another example, the user interface 108 may receive information that indicates whether the user approves of the device 100 executing program logic to begin using the new set of audio-clip data instead of a previously-stored set of audio-clip data.

As yet another example, the user interface 108 may receive information for modifying a set of audio-clip data. The information for modifying the set of audio-clip data may include information for modifying a sequence for playing out audio-clips defined by the set of audio-clip data, (ii) information for removing one or more of the audio-clips defined by the set of audio-clip data, and/or (iii) information for adding data to the set of audio-clip data. With respect to the information for adding data, the additional data may define one or more additional audio-clips, as well as information defining where the one or more additional audio-clips should be located within a particular sequence. Other examples of receiving information for modifying a set of audio-clip data are also possible.

The user interface 108 may be arranged in various configurations for receiving information from the user. For example, the user interface 108 may include one or more buttons and associated circuitry that provides a signal or a change in the signal to the processor 102 when any given button is pressed. Each of the one or more buttons can be associated with a particular bit of information. For instance, a first button may be associated with an affirmative response (i.e., "yes") and a second button may be associated with a negative response (i.e., "no"). The processor 102 can execute program logic for (i) detecting each signal or change in the signal when a given button is pressed, (ii) determining the information associated with a given button press, and (iii) calling other program logic to be executed based on the information associated with the given button press.

As another example, the user interface 108 may include a microphone and associated circuitry for receiving audible information from the user. The audible information may include sounds uttered by the user such as the spoken words "yes" or "no" to approve or disapprove of a function being carried out. The audible information may include sounds uttered by the user for storing as an audio-clip. Other examples of the user interface 108 receiving audible information from the user are also possible.

2. Exemplary Operation

Figure 3:
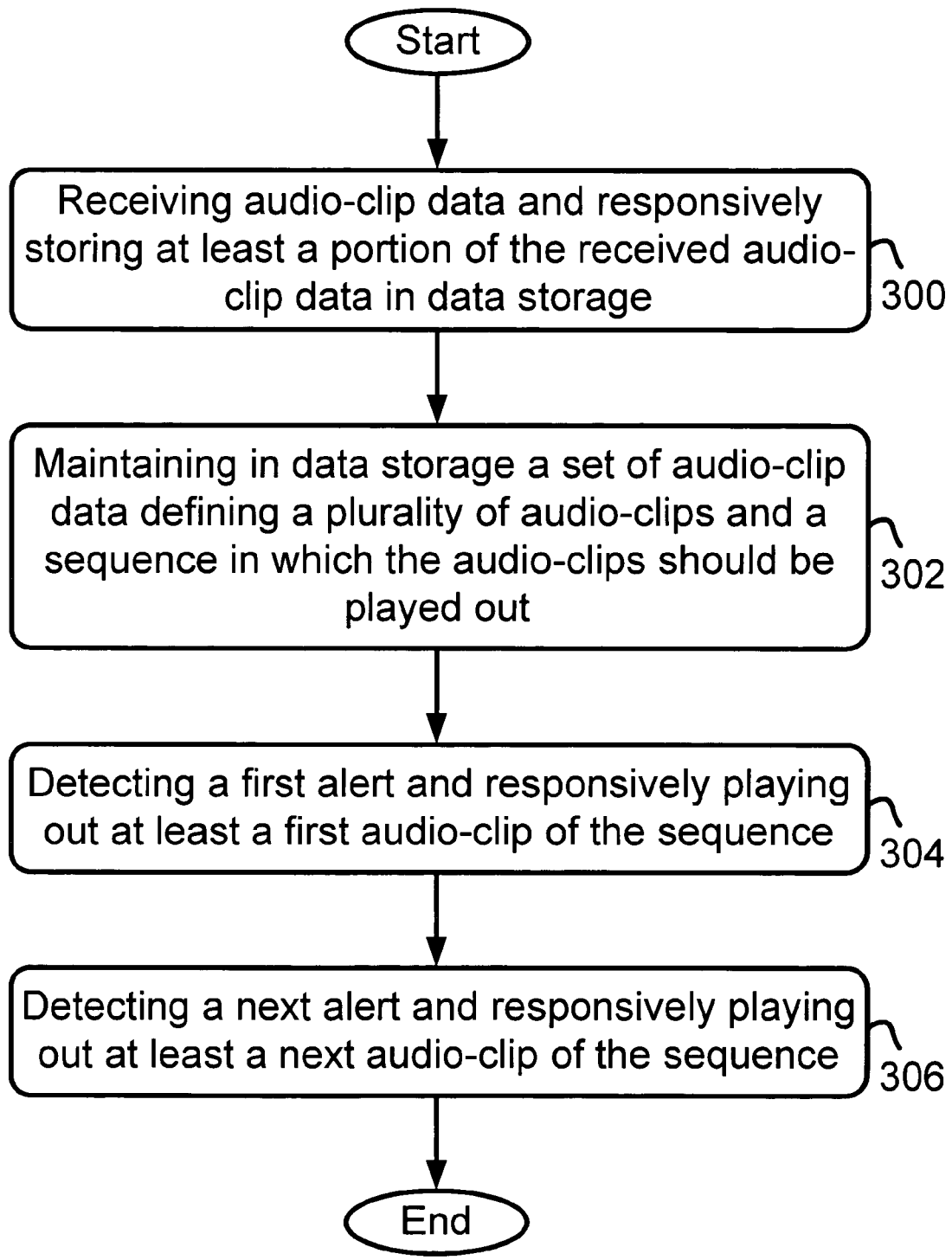
FIG. 3 is a flow chart depicting a set of functions that can be carried out in accordance with an exemplary embodiment.

FIG. 3 is a flow chart provided to illustrate some of the functions that may be carried out in accordance with an exemplary embodiment. In one respect, the functions shown in FIG. 3 may be carried out in an order as shown in the figure (i.e., from top to bottom) or according to another order. In another respect, the functions shown in FIG. 3 may be carried out by a device arranged as the device 100 shown in FIG. 1. In this regard, the functions shown in FIG. 3 will be described as being carried by the processor 102, the data storage 104, the communication interface 106, and/or the user interface 108.

As shown in FIG. 3, block 300 includes receiving audio-clip data and responsively storing at least a portion of the received audio-clip data in data storage. Various methods may be used to carry out this function. For example, receiving the audio-clip data and responsively storing at least a portion of the received audio-clip data may be carried out while the device 100 is being manufactured. Audio-clip data stored while the device is being manufactured is initial (i.e., default) audio-clip data. As an example, the initial audio-clip data may include data defining an initial set of audio-clips and an initial sequence in which the audio-clips of the initial set of audio-clips should be played out. Other examples of initial audio-clip data are also possible.

As another example, receiving the audio-clip data and responsively storing at least a portion of the received audio-clip data may be carried out to modify, replace, and/or add to audio-clip data previously stored in the data storage. The previously-stored data may comprise initial audio-clip data. A variety of audio-clip data may be received to modify, replace, and/or add to previously stored audio-clip data. For example, the received audio-clip data may include one or more distinct audio-clips and/or one or more distinct sequences defining an order for playing out a particular plurality of audio-clips. As another example, the received audio-clip data may include a number indicating a quantity of audio-clips for each sequence defined in the audio-clip data.

As yet another example, audio-clip data received to modify, replace, and/or add to previously stored audio-clip data may include a plurality of pointers. One or more of the pointers may define a position of a particular audio-clip in a particular sequence. Other examples of pointers are also possible. As still yet another example, audio-clip data received to modify, replace, and or add to previously stored audio-clip data may include a plurality of starting-times and/or ending-times. Each particular starting-time and each particular ending-time may be associated with a particular audio-clip.

Receiving the audio-clip data may be carried out by the communication interface 106. For example, in accordance with the exemplary communication interface comprising a wireless communication interface, the communication interface 106 may receive the audio-clip data from a wireless network. As another example, in accordance with the exemplary communication interface comprising a wireline communication interface, the communication interface 106 may receive the audio-clip data from a wireline network. Alternatively, receiving the audio-clip data may be carried out by the user interface 108.

After receiving the audio-clip data, the processor 102 may execute program logic that causes the received audio-clip data to be stored at the data storage 104. Execution of the program logic may cause the communication interface 106 to send the received audio-clip data to the data storage 104 via the connection mechanism 110.

Alternatively, after receiving the audio-clip data but prior to the processor 102 executing the program logic to store the audio-clip data, the processor 102 may execute program logic to prompt a user of the device 100 for approval to store the audio-clip data. Upon receiving user approval to store the audio-clip data, the processor 102 may execute the program logic that causes the audio-clip data to be stored in the data storage 104.

Next, block 302 includes maintaining in data storage a set of audio-clip data defining a plurality of distinct audio-clips and a particular sequence in which the audio-clips should be played out. Maintaining the set of audio-clip data may include maintaining audio-clip data that is received at the communication interface 106 and then stored at the data storage 104. The set of audio-clip data maintained in the data storage may comprise initial audio-clip data and/or audio-clip data received to replace, modify, and/or add to previously-stored audio-clip data.

Maintaining the set of audio-clip data may be carried out in various ways. For example, maintaining the set of audio-clip data may include providing a continuous supply of electrical power to the data storage 104. As another example, maintaining the set of audio-clip data may include executing a set of program logic for providing electrical power to the data storage 104 when the device 100 is turned on and for stopping the supply of electrical power to the data storage 104 when the device 100 is turned off.

As another example, maintaining the set of audio-clip data may include operating the data storage 104 within an environment that is shielded from electromagnetic fields that could cause the set of audio-clip data to be erased from the data storage 104. In this regard, a structure of the device 100 may provide the shielding environment necessary to maintain the set of audio-clip data. Other examples of ways in which the set of audio-clip data may be maintained are also possible.

Next, block 304 includes detecting a first alert event and responsively playing out at least a first audio-clip of the sequence. Alert events, such as the first alert event, may be detected using various means. For example, alert events may be detected by the processor 102 executing program logic to detect the alert events. The program logic for detecting alert events may be arranged as software (e.g., program instructions), firmware (e.g., program instructions stored in read-only data storage), or hardware (e.g., logical circuitry), or any combination thereof.

Alert events, such as a first alert event or a next alert event, may include any of a variety of alert events. In one respect, an alert event may comprise receiving a data communication from a remote device. As an example, receiving the data communication from the remote device may include receiving an incoming message, such as an e-mail message, a Short-Message-Service (SMS) message, an instant message (IM), a voice mail message, a wireless pager message, a phone call page message, or a Session Initiation Protocol (SIP) message. Other examples of receiving a data communication from a remote device are also possible.

A variety of remote devices may send the data communication detectable as an alert event. For example, the remote device that sends the data communication may be arranged as a network server, a base transceiver station (BTS) of a cellular phone system, or a central office switch of a landline telephone system. Other examples of a remote device that may send a data communication detectable as an alert event are also possible.

In another respect, an alert event may comprise an internally-generated alert event. With respect to the device 100, an internally-generated alert event is generated within the device 100. An example of an internally-generated alert event is the expiration of a timer such as a count-up timer from 0 minutes and 0 seconds to 20 minutes and 0 seconds. Another example of an internally-generated alert event is an alarm time being reached such as an alarm time of 7:00 AM being reached when a clock within the device 100 changes from 6:59 AM to 7:00 AM. As yet another example, an internally-generated alert event may comprise the device 100 detecting a fault within the device 100. In this regard, detecting the fault within the device 100 may be carried out by the processor 102 executing program logic that detects faults within the device 100. Other examples of internally-generated alert events are also possible.

After detecting the first alert event, the device 100 may convert the first audio-clip from a digital form to an analog form. In this regard, for example, a digital-to-analog converter may receive a digital form of the first audio-clip from the data storage 104 and convert the digital form of the first audio-clip to an analog form. The analog form of the first audio-clip may be provided to an audio output device for playing out the first audio-clip. The digital-to-analog converter may be located within the processor 102 or remote from the processor 102.

If the first alert event comprises receiving a data communication that indicates an incoming phone call is available for connection to the device 100, playing out the audio-clip may comprise playing out a ringtone to provide an alert. Playing out the ringtone provides an alert that the incoming phone call is available.

Figure 4:
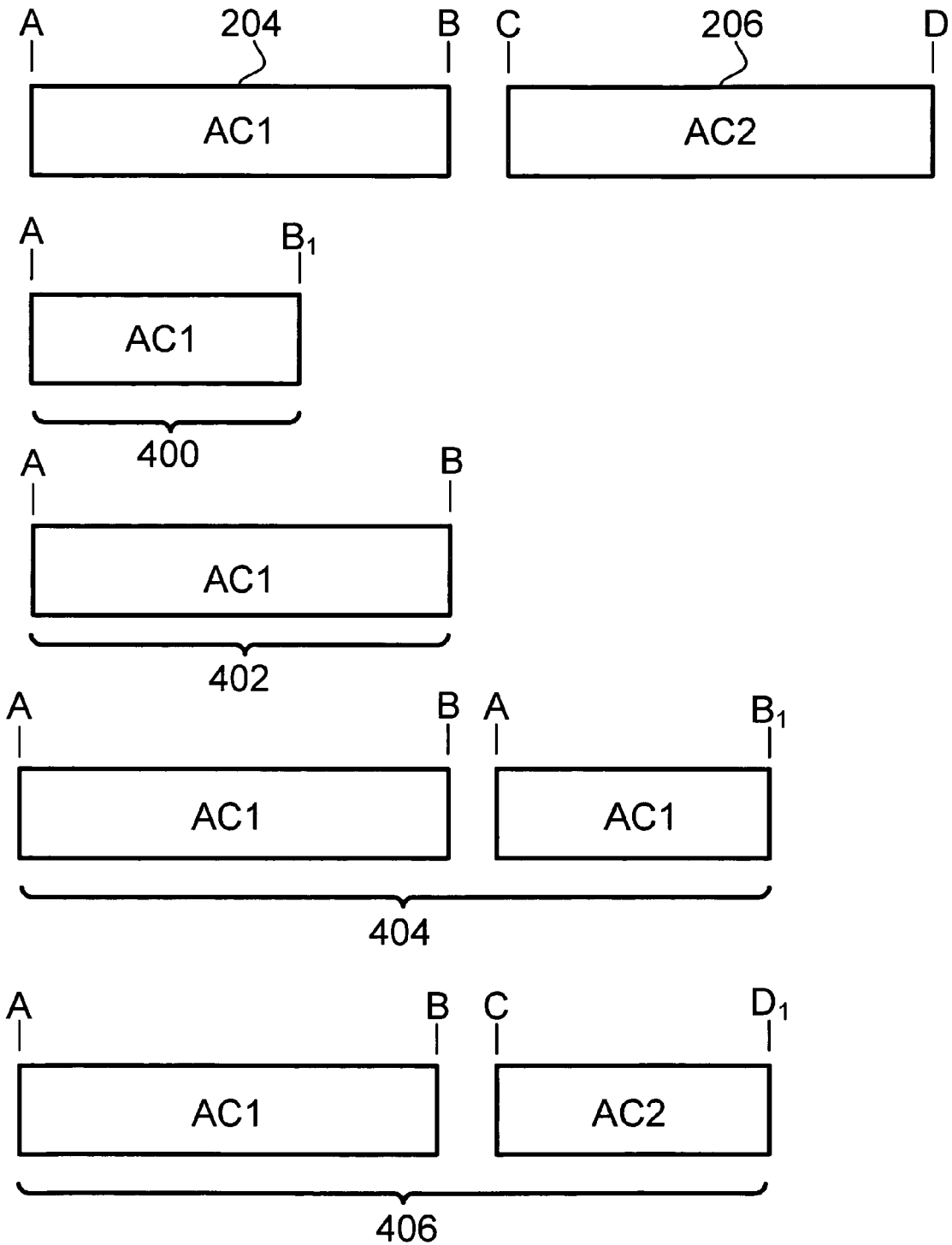
FIG. 4 is a diagram depicting various ways for playing out at least one audio-clip.

Playing out the at least first audio-clip of the sequence may be carried out in various ways. FIG. 4 depicts examples of playing out at least the first audio-clip 204 and depicts the first audio-clip 204 boundaries as pointer A and pointer B and the second audio-clip 206 boundaries as pointer C and pointer D. The methods for playing out the first audio-clip 204, as shown by the examples in FIG. 4, may also be used for playing out at least one other audio-clip within a sequence of audio-clips.

In one respect, playing out the at least a first audio-clip 204 may comprise playing out only a portion of the first audio-clip 204. Playing out only a portion of the first audio-clip or any other audio-clip may occur for any of a variety of reasons. For example, playing out only a portion of the first audio-clip 204 may occur because a user of the device 100 answers an incoming phone call while the first audio-clip 204 is playing to alert the user that the incoming phone call is available for connection to the device 100. Other examples of playing out only a portion of the first audio-clip or another audio-clip are also possible.

In FIG. 4, playing out only a portion of the first audio-clip 204 is shown at 400. In this regard, playing out only a portion of the first audio-clip 204 comprises playing out the first audio-clip 204 from pointer A to a pointer $B_1$. Pointer $B_1$ may be defined in various ways. For example, pointer $B_1$ may represent a decimal pointer between pointer A (100,000) and pointer B (199,999). In this regard, pointer $B_1$ may be a pointer to a data address of 169,999 such that only 70,000 data bytes of the first audio-clip 204 are played out. As another example, pointer $B_1$ may represent a time value between pointer A (0 seconds) and pointer B (5 seconds). In this regard, pointer $B_1$ may be a time value of 3.0 seconds such that only 3.0 seconds of the first audio-clip 204 are played out. Other examples of defining the pointer $B_1$ are also possible.

In another respect, playing out at least the first audio-clip 204 may include playing out the entire first audio-clip. Playing out the entire first audio-clip comprises playing out the first audio-clip from a starting-point associated with the first audio-clip to an ending-point associated with the first audio-clip. As shown in FIG. 4 at 402, playing out the entire first audio-clip 204 comprises playing out the first audio-clip 204 from pointer A to pointer B.

In yet another respect, playing out at least the first audio-clip 204 may include playing out the entire first audio-clip and repeating playout of at least a portion of the first audio-clip. As shown in FIG. 4 at 404, by way of example, playing out the entire first audio-clip 204 and repeating playout of at least a portion of the first audio-clip 204 comprises playing out the first audio-clip 204 from pointer A to pointer B and repeating playout out of at least a portion of the first audio-clip 204. In this example, repeating playout of at least a portion of the first audio-clip 204 comprises playing out the first audio-clip 204 from pointer A to pointer $B_1$. Alternatively, repeating playout of at least a portion of the first audio-clip 204 may comprise playing out a segment of the first audio-clip 204 that is greater than or less than playing out the first audio-clip 204 from pointer A to pointer $B_1$. Other examples of playing out the entire first audio-clip and repeating playout of at least a portion of the first audio-clip are also possible.

In still yet another respect, playing out at least the first audio-clip 204 may include playing out the entire first audio-clip 204 and playing out at least a portion of one or more other audio-clips in the sequence. As shown in FIG. 4 at 406, by way of example, playing out the entire first audio-clip 204 and playing out at least a portion of one or more other audio-clips in the sequence comprises playing out the first audio-clip 204 from pointer A to pointer B and then playing out the second audio-clip 206 from pointer C to pointer $D_1$. Alternatively, playing out at least a portion of one or more other audio-clips in the sequence may comprise playing a segment of the second audio-clip 206 that is greater than or less than playing out the second audio-clip 206 from pointer C to pointer $D_1$. Other examples of playing out the entire first audio-clip and playing out at a least a portion of one or more other audio-clips in the sequence are also possible.

Next, block 306 includes detecting a next alert event and responsively playing out at least a next audio-clip of the sequence. Detecting the next alert event may be carried out in various ways. In one respect, detecting the next alert event may be carried out using means for detecting the first alert event. In this regard, the first alert event and the next alert event may be the same type of alert event (e.g., an alert event comprising receiving an incoming phone call). As an example, the processor 102 may execute a first set program logic to detect that a first incoming phone call is the first alert event and re-execute the first set of program logic to detect that a next incoming phone call is the next alert event.

In another respect, detecting the next alert event may be carried out using means that differ from the means for detecting the first alert event. In this regard, the first alert event may comprise an alert event of a first type and the next alert event may comprise an alert event of a second type. As an example, the processor 102 may execute the first set of program logic to detect that an incoming phone call is the first alert event and execute a second set of program logic to detect that an incoming e-mail message is the next alert event. In this regard the first type of alert event is receiving an incoming phone call and the second type of alert event is receiving an incoming e-mail message.

As another example, the first type of alert event may comprise receiving an incoming phone call from a first designated caller and the second type of alert event may comprise receiving an incoming phone call from a second designated caller. Other examples of the first alert event comprising an alert event of a first type and the next alert event comprising an alert event of a second type are also possible.

In order to know which audio-clip of a sequence of audio-clips is the next audio audio-clip, the data storage 104 may include a data location for storing data to determine the next audio-clip. For example, the data to determine the next audio-clip may comprise data that indicates a pointer of the next audio-clip (e.g., pointer C to indicate the second audio-clip 206 is the next audio-clip to be played out). As another example, the data to determine the next audio-clip may comprise data that indicates a pointer of the most-recently played audio-clip (e.g., pointer A to indicate that the first audio-clip 204 is the most-recently played audio-clip. Other examples of data to determine the next audio-clip are also possible.

Playing out at least the next audio-clip of the sequence may be carried using the methods for playing out at least the first audio-clip of the sequence, except that playing out the next audio-clip may begin by playing out the next audio-clip in the sequence after the most-recently played audio-clip or by continuing playout of a partially played-out audio-clip from the point where playout stopped. For example, if the second audio-clip 206 is only partially played out and playout of the second audio-clip 206 stops at pointer $D_1$, then playout of the next audio-clip may continue at a data byte, time, or some other value that immediately follows pointer $D_1$. If the most-recently played audio-clip is a last audio-clip in a sequence, then the next audio-clip is the first audio-clip of the sequence.

By way of example, playing out the at least a next audio-clip may include: (i) playing out only a portion of the next audio-clip, (ii) playing out the entire next audio-clip, (iii) playing out the entire next audio-clip and repeating playout of at least a portion of the next audio-clip, or (iv) playing out the entire next audio-clip and playing out at least a portion of a subsequent audio-clip in the sequence.

In another embodiment of the invention, the data storage 104 may store (i) a first set of audio-clip data and a first sequence in which the audio-clips of the first set are to be played out, and (ii) a second set of audio-clip data and a second sequence in which the audio-clips of the second set are to be played out. The first set of audio-clips and the second set of audio-clips could be different sets of audio-clips stored in the data storage 104, or the first set of audio-clips and the second set of audio-clips could be the same set of audio-clips.

In accordance with this embodiment of the invention, the processor 102 may execute program logic to detect a first alert event of a first type of alert event and responsively play out a first audio-clip of the first sequence, and detect a next alert event of the first type of alert event and responsively play out a next audio-clip in the first sequence. As an example, the first type of alert event may comprise receiving an incoming phone call. Other examples of the first type of alert event are also possible.

Further, the processor 102 may execute program logic to detect a first alert event of a second type of alert event and responsively play out a first audio-clip of the second sequence, and detect a next alert event of second type of alert event and responsively play out a next audio-clip in the second sequence. As an example, the second type of alert event may comprise receiving an incoming e-mail message. Other examples of the second type of alert event are also possible.

Further still, in accordance with this other embodiment of the invention, detection of alert events of the first type of alert event and alert events of the second type of alert event may occur in various orders. For example, the processor 102 may detect two or more alert events of the first type of alert event and then detect one or more alert events of the second type. As another example, the processor 102 may detect an alert event of the first type of alert event, then detect an alert event of the second type of alert event, and then detect an alert event of the first type of alert event. Other examples of the order in which detection of alert events of the first type and alerts of the second type occur are also possible.

3. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. A method comprising:
    maintaining in data storage a set of audio-clip data defining a plurality of distinct audio-clips and a particular sequence in which the audio-clips should be played out;
    detecting a first alert event and responsively playing out at least a first audio-clip of the sequence, wherein playing out at least the first audio-clip of the sequence comprises a function selected from the group consisting of: (i) playing out a portion of the first audio-clip, (ii) playing out the first audio-clip in its entirety, and (iii) playing out the first audio-clip in its entirety and repeating playout of at least a portion of the first audio-clip; and
    detecting a next alert event and responsively playing out at least a next audio-clip of the sequence, wherein playing out at least the next audio-clip of the sequence comprises a function selected from the group consisting of: (i) playing out a portion of the next audio-clip, (ii) playing out the next audio-clip in its entirety, and (iii) playing out the next audio-clip in its entirety and repeating playout of at least a portion of the next audio-clip.

2. The method of claim 1,
    wherein each alert event comprises receiving an incoming call, and
    wherein each audio-clip comprises a ringtone.

3. The method of claim 1, wherein each alert event comprises: (i) receiving an incoming e-mail message, (ii) receiving an incoming Short-Message-Service (SMS) message, (iii) receiving an incoming Instant Message (IM), (iv) receiving an incoming voice mail message, (v) receiving an incoming wireless pager message, (vi) receiving an incoming phone call page, or (vii) receiving an incoming session initiation protocol (SIP) message.

4. The method of claim 1, wherein the method is carried out in a wireless communication device.

5. The method of claim 1 further comprising:
    receiving the audio-clip data via a communication interface, and
    executing program instructions to store the received audio-clip data in the data storage.

6. The method of claim 5, further comprising:
    prompting a user for approval to receive the audio-clip data; and
    receiving the approval from the user.

7. The method of claim 1, further comprising:
    converting the first audio-clip from digital form to analog form and providing the analog form of the first audio-clip to an audio output device for playing out the first audio-clip; and
    converting the second audio-clip from digital form to analog form and providing the analog form of the second audio-clip to the audio output device for playing out the second audio-clip.

8. A device comprising:
    a processor;
    a communication interface;
    data storage;
    a set of audio-clip data stored in the data storage and defining a plurality of distinct audio-clips and a particular sequence in which the audio-clips should be played out; and
    program logic stored in the data storage and executable by the processor to (i) detect a first alert event and responsively play out at least a first audio-clip of the sequence, and (ii) detect a next alert event and responsively play out at least a next audio-clip of the sequence,
    wherein the set of audio-clip data comprises data selected from the group consisting of: (i) a number indicating a quantity of audio-clips in the sequence, (ii) a plurality of pointers, wherein each pointer identifies a particular position of a particular audio-clip in the sequence, (iii) a plurality of audio-clip starting-times, wherein each audio-clip starting-time is associated with a particular audio-clip, and (iv) a plurality of audio-clip ending-times, wherein each audio-clip ending-time is associated with a particular audio-clip.

9. The device of claim 8, wherein each alert event comprises the communication interface receiving a respective data communication comprising (i) data that indicates a phone call is available for connection to the device, (ii) a message-alert, or (iii) a message.

10. The device of claim 8,
wherein the communication interface comprises an interface to a wireless network, and
wherein the communication interface receives the set of audio-clip data from a remote server via the wireless network.

11. The device of claim 10,
wherein the set of audio-clip data received at the communication interface includes the plurality of audio-clips and meta data that defines at least one pointer for each of the plurality of audio-clips, and
wherein each pointer defines a boundary of at least one of the audio-clips.

12. The device of claim 10, further comprising:
a user interface for receiving user approval,
wherein receiving the set of audio-clip data is conditioned on receiving the user approval.

13. The device of claim 8, further comprising:
a user interface comprising at least one audio output interface for playing out each audio-clip.

14. The device of claim 8, wherein the program logic is further executable to receive user input that redefines the sequence in which the audio-clips should be played out.

15. A device comprising:
a processor;
a communication interface;
data storage;
a first set of audio-clip data stored in the data storage and defining a first set of audio-clips of a plurality of distinct audio-clips and a first sequence in which the audio-clips of the first set should be played out;
a second set of audio-clip data stored in the data storage and defining a second set of audio-clips of the plurality of distinct audio-clips and a second sequence in which the audio-clips of the second set should be played out; and
program logic stored in the data storage and executable by the processor to (i) detect a first alert event of a first type and responsively play out at least a first audio-clip of the first sequence, and (ii) detect a next alert event of the first type and responsively play out at least a next audio-clip of the first sequence,
wherein the program logic is further executable to (i) detect a first alert event of a second type and responsively play out at least a first audio-clip of the second sequence, and (ii) detect a next alert event of the second type and responsively play out at least a next audio-clip of the second sequence.

16. The device of claim 15, wherein the first set of audio-clips and the second set of audio-clips each include all audio-clips of the plurality of distinct audio-clips.

17. The method of claim 15, wherein the first alert event and the next alert event each comprise a respective alert event selected from the group consisting of (i) receiving an incoming message, (ii) receiving an e-mail message, (iii) receiving a Short-Message-Service (SMS) message, (iv) receiving an instant message, (v) receiving a voice mail message, (vi) receiving a wireless pager message, (vii) receiving a phone call page message, (viii) receiving a Session Initiation Protocol (SIP) message, (ix) detecting expiration of a timer, and (x) detecting a fault within a device that comprises the data storage.

18. A method comprising:
maintaining in data storage a set of audio-clip data defining a plurality of distinct audio-clips and a particular sequence in which the audio-clips should be played out;
detecting a first alert event and responsively playing out at least a first audio-clip of the sequence; and
detecting a next alert event and responsively playing out at least a next audio-clip of the sequence,
wherein the set of audio-clip data includes a plurality of audio-clip pointers that each define an audio-clip starting-point for a respective one of the audio-clips or an audio-clip ending-point for a respective one of the audio-clips,
wherein each of the plurality of audio-clips is associated with one of the audio-clip starting-points and one of the audio-clip ending-points, and
wherein playing out a given audio-clip includes playing the given audio-clip from the audio-clip starting-point associated with the given audio-clip to the audio-clip ending-point associated with the given audio-clip.

19. The method of claim 18, wherein each of the audio-clip starting-points defines a unique starting-time, and each of the audio-clip ending-points defines a unique ending-time.

20. The method of claim 18, wherein the first alert event and the next alert event each comprise a respective alert event selected from the group consisting of (i) receiving an incoming message, (ii) receiving an e-mail message, (iii) receiving a Short-Message-Service (SMS) message, (iv) receiving an instant message, (v) receiving a voice mail message, (vi) receiving a wireless pager message, (vii) receiving a phone call page message, (viii) receiving a Session Initiation Protocol (SIP) message, (ix) detecting expiration of a timer, and (x) detecting a fault within a device that comprises the data storage.

21. A method comprising:
maintaining in data storage a set of audio-clip data defining a plurality of distinct audio-clips and a particular sequence for playing out the audio-clips, wherein the plurality of distinct audio clips comprises a first audio clip, the audio clip data further defining (i) a starting point of the first audio clip as a first starting-point, and (ii) an ending point of the first audio clip as a first ending-point;
detecting a first alert event and responsively playing out at least a portion of the first audio-clip, wherein playing out at least a portion of the first audio clip includes playing out the first audio clip from the first starting-point to a given point of the first audio clip, wherein the given point of the first audio clip is between the first starting-point and the first ending-point;
detecting a next alert event and responsively playing out at least another portion of the first audio clip, wherein playing out at least another portion of the first audio clip includes playing out the first audio clip from the first given point of the first audio clip to the first ending point.

22. The method of claim 21,
wherein the plurality of distinct audio clips further comprises a second audio clip, the audio clip data further defining (i) a starting point of the second audio clip as a second starting-point, and (ii) an ending point of the second audio clip as a second ending-point,
wherein the particular sequence identifies that the second audio clip is to be played out after first audio clip, and
wherein playing out at least another portion of the first audio clip further comprises, after playing out the first audio clip from the first given point of the first audio clip to the first ending point, starting play out of the second audio clip at the second starting point and then playing out at least a portion of the second audio clip.

23. The method of claim 22, wherein playing out at least a portion of the second audio clip includes playing out the second audio clip from the second starting-point to the second ending-point.

24. The method of claim 21, wherein the plurality of distinct audio-clips further comprises a last audio clip, wherein playing out the plurality of audio-clips in accordance with the particular sequence begins by playing out the first audio clip, and ends by playing out the last audio clip, the method further comprising: after playing out the plurality of audio-clips in accordance with the particular sequence, continuing playout of the plurality of audio clips by playing out the first audio clip.

25. A device comprising: a processor; and a data storage device that contains program instructions, and a set of audio-clip data that defines a plurality of distinct audio-clips and a particular sequence for playing out the audio-clips, wherein the plurality of distinct audio clips comprises a first audio clip, and wherein the set of audio clip data further defines (i) a starting point of the first audio clip as a first starting-point, and (ii) an ending point of the first audio clip as a first ending-point, wherein the program instructions are executable by the processor to detect a first alert event and to responsively play out at least a portion of the first audio-clip, wherein play out of at least a portion of the first audio clip includes play out of the first audio clip from the first starting-point to a given point of the first audio clip, wherein the given point of the first audio clip is between the first starting-point and the first ending-point, and wherein the program instructions are executable by the processor to detect a next alert event and to responsively play out at least another portion of the first audio clip, wherein play out of at least another portion of the first audio clip includes play out of the first audio clip from the first given point of the first audio clip to the first ending point.

26. The device of claim 25, wherein the device comprises a device selected from the group consisting of (i) a wireless communication device, (ii) a cell phone, (iii) a personal digital assistant (PDA), (iv) a pager, (v) a notebook computer having a wireless network interface, (vi) a Session Initiation Protocol (SIP) telephone, and (vii) a Programmable Logic Controller (PLC).

27. The device of claim 25, wherein the plurality of distinct audio clips further comprises a second audio clip, wherein the set of audio clip data further defines (i) a starting point of the second audio clip as a second starting-point, and (ii) an ending point of the second audio clip as a second ending-point, wherein the particular sequence identifies that the second audio clip is to be played out after first audio clip, and wherein play out of at least another portion of the first audio clip further comprises, after play out of the first audio clip from the first given point of the first audio clip to the first ending point, play out of at least a portion of the second audio clip starting at the second starting-point.

* * * * *

UNITED STATES PATENT AND TRADEMARK OFFICE
CERTIFICATE OF CORRECTION

PATENT NO. : 7,653,418 B1  Page 1 of 1
APPLICATION NO. : 11/237058
DATED : January 26, 2010
INVENTOR(S) : Biere et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Twenty-third Day of November, 2010

David J. Kappos
*Director of the United States Patent and Trademark Office*